United States Patent [19]
Thompson

[11] Patent Number: 4,988,240
[45] Date of Patent: Jan. 29, 1991

[54] MATERIAL TRANSFER ASSEMBLY

[76] Inventor: Andy L. Thompson, R.R. 1, Courtland, Kans. 66939

[21] Appl. No.: 279,840

[22] Filed: Dec. 5, 1988

[51] Int. Cl.⁵ .............................................. B65G 53/40
[52] U.S. Cl. .................................... 406/166; 406/167; 406/158; 406/41; 406/173
[58] Field of Search ............... 406/166, 167, 158, 173, 406/109, 41; 285/261, 184; 141/387, 388; 137/615

[56] References Cited

U.S. PATENT DOCUMENTS

| | | | |
|---|---|---|---|
| 623,109 | 4/1899 | Schuman | 406/166 |
| 747,896 | 12/1903 | Sharpe, Jr. | 406/166 |
| 761,761 | 6/1904 | Conner | 406/167 |
| 804,511 | 11/1905 | Winters | 285/264 |
| 2,456,744 | 12/1948 | Sjoberg | 285/261 |

FOREIGN PATENT DOCUMENTS 2237789 9/1973 Fed. Rep. of Germany ...... 406/166
107343 2/1925 Switzerland ........................ 285/184

*Primary Examiner*—Joseph F. Peters, Jr.
*Assistant Examiner*—Anne E. Bidwell
*Attorney, Agent, or Firm*—Phillip A. Rein

[57] ABSTRACT

This invention relates to a material transfer assembly usable with a pneumatic grain handling system to transfer granular material from a storage bin to a transport truck. The material transfer assembly is connected to a discharge side of the pneumatic grain handling system and includes a discharge joint assembly mounted between an inlet tube assembly and a discharge tube assembly. The discharge joint assembly is provided with a ball sleeve assembly mounted about a ball joint to provide for pivotal movement about a horizontal axis through a tube actuator assembly. The inlet tube assembly is provided with telescopingly mounted first and second tube members operable wherein the second tube member is selectively secured in a desired rotational position about a vertical axis by a lock arm assembly.

10 Claims, 3 Drawing Sheets

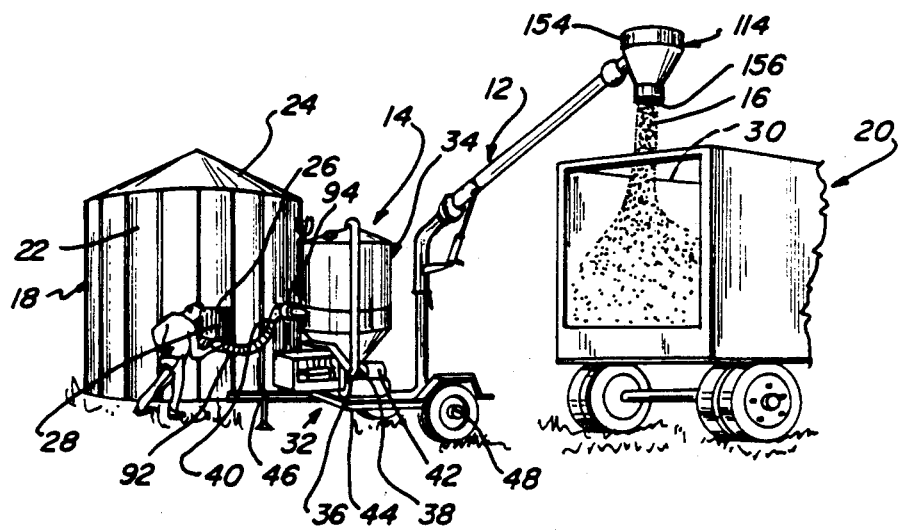
Fig_1
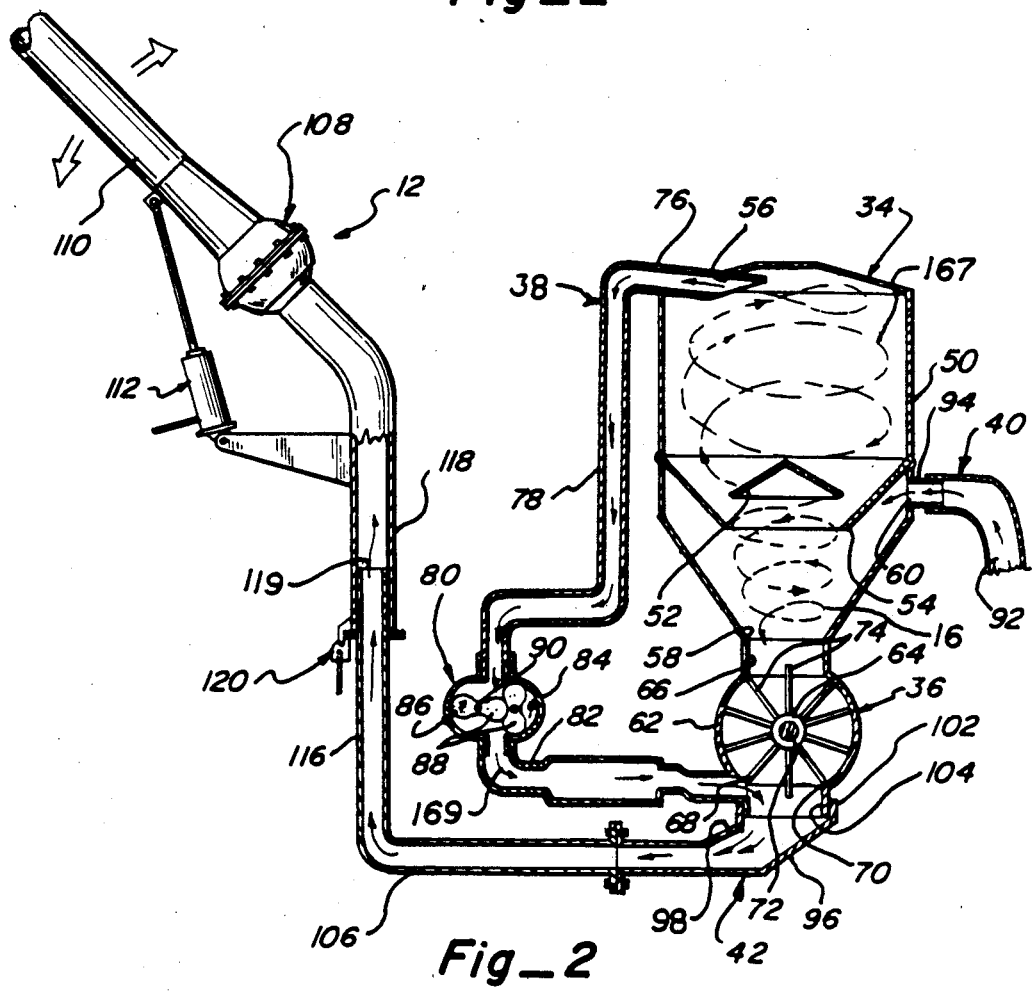
Fig_2

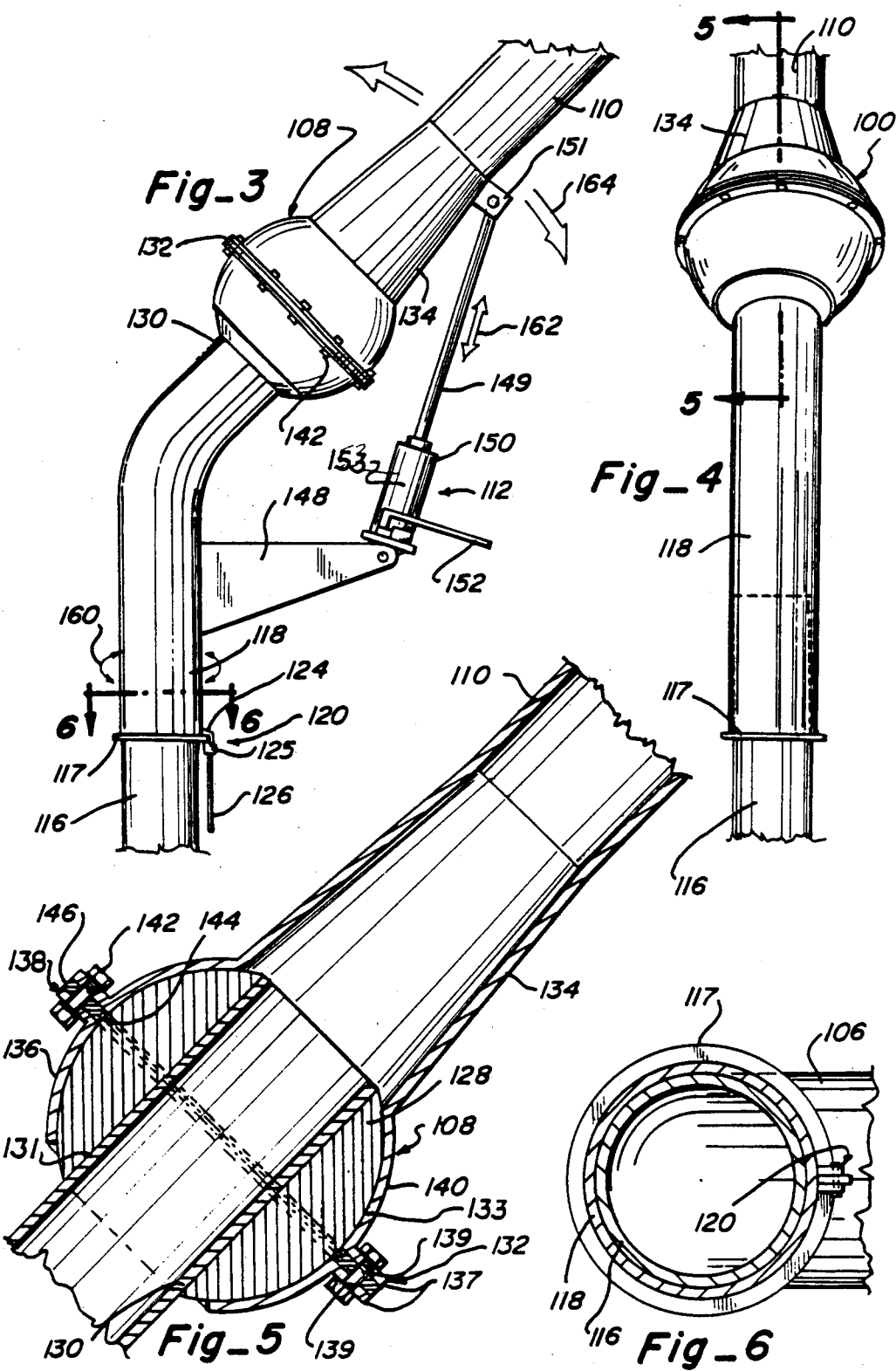

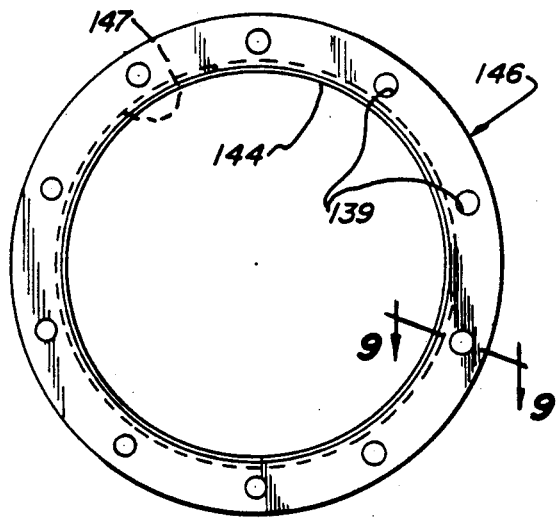
Fig_7
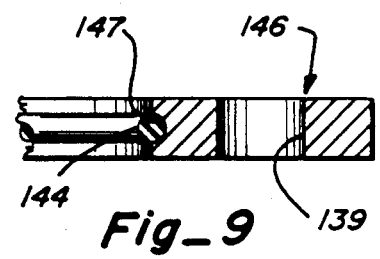
Fig_9
Fig_8
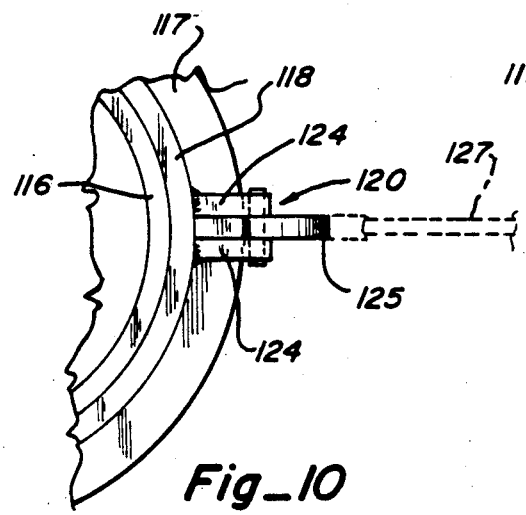
Fig_10
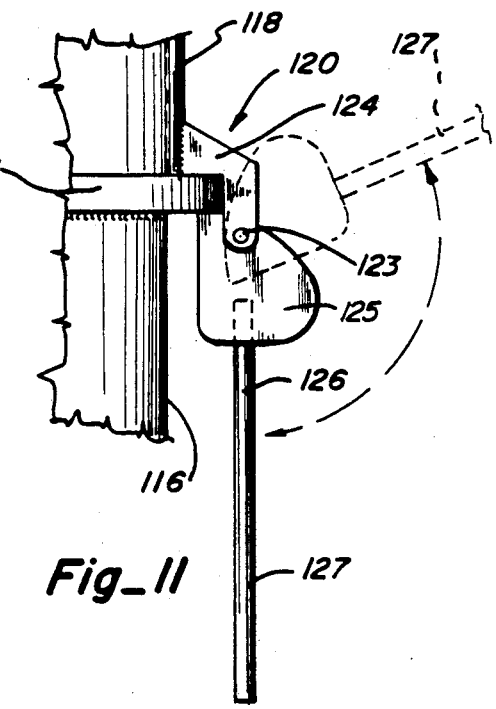
Fig_11

MATERIAL TRANSFER ASSEMBLY

PRIOR ART

A patent search on this invention revealed the following United States Patents:

| U.S. Pat. No. | Invention | Inventor |
|---|---|---|
| 791,093 | STAND PIPE | Charles Gulland |
| 804,511 | STAND PIPE | David L. Winters |
| 1,946,110 | UNIVERSAL PIPE JOINT | Sidney G. Plummer |
| 2,456,744 | UNIVERSAL PIPE COUPLING | John G. Sjoberg |
| 3,429,588 | JOINT CONSTRUCTION | Arthur J. Nelson |
| 4,045,054 | APPARATUS FOR RIGIDLY INTERCONNECTING MISALIGNED PIPE ENDS | James F. Arnold |

The Winters and Gulland patents disclose locomotive stand pipes for adding water to a locomotive.

The Arnold patent discloses an apparatus for interconnecting misaligned pipe ends which are anchored in a given adjusted position.

The Sjoberg patent discloses a ball joint structure having a seal member and having a plurality of peripheral bolt members for interconnecting.

The Plummer patent discloses a universal pipe joint having a plurality of connector bolts, a flexible seal member, and a grease zerk.

The Nelson patent discloses a joint construction having a tapered wall portion on a movable pipe member similar to your invention.

PREFERRED EMBODIMENT OF THE INVENTION

In one preferred embodiment of this invention, a material transfer assembly is utilized with a pneumatic grain handling system to transfer granular material from a storage bin into a transport truck. The pneumatic grain handling system utilizes an air flow means for moving the granular material from a material inlet assembly into a material receiver and separator assembly which is then discharged into a pneumatic discharge assembly through the material transfer assembly of this invention into the transport truck. The material transfer assembly includes (1) an inlet tube assembly; (2) a discharge joint assembly to receive the granular material from the inlet tube assembly; (3) a discharge tube assembly receiving the granular material from the discharge joint assembly; (4) a tube actuator assembly connected to the discharge tube assembly to vary the direction of the material discharge from the discharge joint assembly; and (5) a discharge cyclone assembly to receive the granular material before dumping same into the transport truck. The inlet tube assembly includes first and second tube members telescoped within each other and having a lock arm assembly whereby the second tube member is rotatable 360 degrees and locked by the lock arm assembly in the desired position for directing the discharge of the granular material therefrom. The discharge joint assembly includes a ball joint member operable to permit vertical movement of a conical discharge tube to vary the height of discharge from the discharge cyclone assembly into the transport truck. The tube actuator assembly includes a piston and cylinder assembly mounted between the second tube member and the discharge tube assembly to adjust the vertical position of the discharge cyclone assembly.

OBJECTS OF THE INVENTION

One object of this invention is to provide a material transfer assembly usable with a pneumatic grain handling system and having means to vertically adjust a discharge tube assembly about vertical and horizontal axes to properly direct the discharge of granular material into a transport truck or the like.

One further object of this invention is to provide a material transfer assembly usable with a pneumatic grain handling system and having a discharge joint assembly which is rotationally adjustable without impeding the flow of granular materials therethrough for movement pneumatically outwardly through a discharge tube assembly.

One other object of this invention is to provide a material transfer assembly to receive and transfer granular material through a discharge joint assembly without impeding the material flow and being adjustable about vertical and horizontal axes.

Still, one further object of this invention is to provide a material transfer assembly operable to initially receive granular material under pnuematic pressure and having (1) an inlet tube assembly which is adjustably rotatable 360 degrees about a vertical axis; and (2) a tube actuator assembly utilizing a piston and cylinder assembly to adjust a discharge tube assembly about a horizontal axis for directing the granular material to a desired point of discharge.

One other object of this invention is to provide a material transfer assembly which is sturdy in construction, easy to assemble and disassemble, easy to use, and substantially maintenance free.

Various other objects, advantages and features of the invention will become apparent to those skilled in the art from the following discussion, taken in conjunction with the accompanying drawings, in which:

FIGURES OF THE INVENTION

FIG. 1 is an elevational view illustrating a pneumatic grain handling system utilizing a material transfer assembly of this invention transferring granular material from a storage bin into a transport truck;

FIG. 2 is a fragmentary sectional view illustrating the operation of the pneumatic grain handling system with the material transfer assembly of this invention;

FIG. 3 is a fragmentary elevational view of the material transfer assembly of this invention;

FIG. 4 is a fragmentary top plan view of the material transfer assembly illustrated in FIG. 3;

FIG. 5 is an enlarged view taken along line 5—5 in FIG. 4;

FIG. 6 is an enlarged sectional view taken along line 6—6 in FIG. 3;

FIG. 7 is a top plan view of a clamp ring member in a discharge joint assembly;

FIG. 8 is side elevational view of the clamp ring member shown in FIG. 7;

FIG. 9 is an enlarged fragmentary sectional view taken along line 9—9 in FIG. 7;

FIG. 10 is a fragmentary top view illustrating a lock arm assembly of this invention; and FIG. 11 is a fragmentary side elevational view of the lock arm assembly shown in FIG. 10 with an unlocked condition illustrated in dotted lines.

The following is a discussion and description of preferred specific embodiments of the material transfer assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail and, in particular to FIG. 1, a material transfer assembly of this invention, indicated generally at 12, is utilized with a pneumatic grain handling system 14 operable to transfer granular material 16 from a storage bin 18 into a transport truck 20 for movement of the granular material 16. The pneumatic grain handling system 14 is a known method of using pneumatic means for picking up and transferring the granular material 16 from the storage bin 18.

The granular storage bin 18 is of a generally circular shape having upright side walls 22 interconnected along a top edge by a tapered top wall 24. The side walls 22 are provided with an access opening 26 selectively enclosed by a closure door 28.

The transport truck 20 is provided with an open top section 30 to receive the granular material 16 therein.

The pneumatic grain handling system 14 includes (1) a trailer support assembly 32; (2) a material receiver and separator assembly 34 mounted on the trailer support assembly 32; (3) an airlock assembly 36 connected to the material receiver and separator assembly 34; (4) a pneumatic discharge assembly 38 to receive the granular material 16 from the material receiver and separator assembly 34; (5) a primary material inlet assembly 40 to transfer the granular material from the storage bin 18 to the material receiver and separator assembly 34; and (6) a mixing chamber 42 operable to receive a combination of blower discharge air and granular material 16 for transfer to the material transfer assembly 12.

The trailer support assembly 32 is illustrated of a portable nature having a main frame structure 44 connected to a tongue member 46 mounted on support wheels and axle 48 for ease of movement by a towing vehicle.

The material receiver and separator assembly 34 includes a conical housing 50 having mounted therein a central deflector cone 52 and a material deflector cone 54. The conical housing 50 is provided with an upper pneumatic discharge opening 56; a lower discharge opening 58; and a material inlet opening 60.

The airlock assembly 36 is provided with a housing member 62 connected about the lower discharge opening 58 on the material receiver and separator assembly 34 and having a rotor assembly 64 mounted therein. The housing member 62 includes a material inlet opening 66; a pneumatic inlet opening 68, and a discharge opening 70 to discharge the granular material 16 therefrom.

The rotor assembly 64 includes a drive shaft 72 having a plurality of vane members 74 connected thereto so as to provide for only material discharge on rotation of the rotor assembly 64.

The pneumatic discharge assembly 38 includes an outlet tube member 76 mounted about the upper discharge opening 56 in the material receiver and separator assembly 34; a transfer tube member 78 interconnected at one end to the outlet tube member 76; a main blower assembly 80 connected to another end of the transfer tube member 78; and a discharge tube member 82 connected to an outlet side of the main blower assembly 80.

The main blower assembly 80 includes a blower housing 84 having a vane assembly 86 mounted therein. The vane assembly 86 includes a plurality of vane members 88 mounted on a central drive shaft 90. The main blower assembly 80 is operable to transfer air from the upper discharge opening 56 in the material receiver and separator assembly 34 to the airlock assembly 36 for mixing with the granular material 16 being discharged therefrom for transfer by pneumatic means to the material transfer assembly 12.

The primary material inlet assembly 40 includes a vacuum hose member 92 connected to a connector joint member 94 which, in turn, is connected to the material inlet opening 60 in the material receiver and separator assembly 34. The vacuum hose member 92 is operable to be placed within the storage bin 18 to pick up and transfer the granular material 16 therein for subsequent movement through the pneumatic grain handling system 14 to the material transfer assembly 12 for movement into the transport truck 20.

The mixing chamber 42 includes a discharge tube assembly 96 connected to the combination discharge opening 70 on the airlock assembly 36. The discharge tube assembly 96 includes a mixer tube member 98 secured by connector members 102 to an anchor flange 104. The discharge tube assembly 96 preferably having quick disconnect members so that the same can be readily disconnected from the pneumatic grain handling system 14 for ease of storage and transport on the trailer support assembly 32.

The material transfer assembly 12 includes (1) an inlet tube assembly 106 connected to the discharge tube assembly 96; (2) a discharge joint assembly 108 connected to the inlet tube assembly 106; (3) a discharge tube assembly 110 connected to the outlet side of the discharge joint assembly 108; (4) a tube actuator assembly 112 operably connected between the inlet tube assembly 106 and the discharge tube assembly 110 for adjustable movement about a horizontal axis; and (5) a discharge cyclone assembly 114 connected to an outer end of the discharge tube assembly 110.

The inlet tube assembly 106 includes a first tube member 116 connected to the mixer tube member 98; a second tube member 118 telescopingly mounted about the first tube member 116; and a lock arm assembly 120 mounted between the first tube member 116 and the second tube member 118. The first tube member 116 has a laterally extended support flange 117 welded thereto below an upper discharge opening 119 operable to receive and support the second tube member 118 thereon as will be explained.

The second tube member 118 is telescoped about the first tube member 116 having a bottom edge mounted on an upper surface of the support flange 117.

The lock arm assembly 120 includes a pair of parallel adjacent members 124 welded to the second tube member 118 having a cam lock member 126 pivotally connected therebetween. The anchor members 124 have aligned holes therein with a pivot pin 123 mounted therein to receive and support the cam lock member 126 thereon.

The cam lock member 126 is provided with a cam member 125 having an elongated lock arm 127 integral therewith. The cam member 125 is of an arcuate shape being pivotally mounted about the pivot pin 123 and movable from locked to unlocked conditions as noted in FIG. 11. The cam member 125 is provided with a cam surface 129 which is engageable with a lower surface of the support flange 117 to prevent relative rotational movement of the first tube member 116 relative to the second tube member 118. The anchor members 124 are welded to the outer surface of the second tube member 118 and rotates therewith to a given adjusted position whereupon the lock arm 127 is movable downwardly to an upright locked condition as noted in solid lines in FIG. 11.

As noted in FIG. 5, the discharge joint assembly 108 includes (1) a ball joint member 128; (2) an inlet tube member 130 having the ball joint member 128 mounted on the upper outer end thereof; (4) a ball sleeve assembly 132 mounted about the ball joint member 128; and (5) a conical discharge tube 134 connected to the ball sleeve assembly 132 and connected at an outer end to the discharge tube assembly 110. The ball joint member 128 has a central opening 131 in which the inlet tube member 130 is mounted and an outer spherical circular surface 133.

The ball sleeve assembly 132 includes (1) a first sleeve member 136 mounted about a lower portion of the spherical ball joint member 128; (2) a connector rim assembly 138 secured to the first sleeve member 136; and (3) a second sleeve member 140 connected by the connector rim assembly 138 to the first sleeve member 136. The first sleeve member 136 and the second sleeve member 140 are respectively connected to a flange member 137 of the connector rim assembly 138 having spaced anchor holes 139 therein.

The connector rim assembly 138 further includes (1) a plurality of anchor members 142 interconnecting the first sleeve member 136 to the second sleeve member 140; (2) a seal member 144 engagable in a sealing member with the ball joint member 128; and (3) a clamp ring member 146 mounted between the first sleeve member 136 and the second sleeve member 140. The anchor members 142 are nut and bolt members usable in a conventional manner. The seal member 144 is an O-ring structure constructed of a resilient rubber material for sealing purposes. The clamp ring member 146 is of a generally circular ring construction having a ring groove 147 to receive the seal member 144 therein and having a plurality of spaced anchor holes 139 therein.

It is noted that the anchor holes 139 in the first sleeve member 136, the second sleeve member 140, and the clamp ring member 146 are equally spaced so as to be aligned with each other in the assembled condition to be clamped together by the anchor members 142.

The conical discharge tube 134 is of a shape so as to not impede the discharge of granular material 16 from the inlet tube member 130 while moving outwardly into the discharge tube assembly 110. This is due to the angular clearance with the adjustment of the discharge tube assembly 110 about a horizontal axis.

As noted in FIG. 3, the tube actuator assembly 112 includes (1) a support plate member 148 secured as by welding to an upright side of the second tube member 118; (2) a piston and cylinder assembly 150 mounted on an outer portion of the support plate member 148; and (3) a control actuator 152 connected to the piston and cylinder assembly 150 for operation thereof. The piston and cylinder assembly 150 includes a piston rod 149 having one end mounted within a cylinder assembly 153 and the other end secured by a connector plate 151 to an outer discharge portion of the discharge tube assembly 110. The piston and cylinder assembly 150 can be hydraulically or manually operated through the control actuator 152 to move the piston rod 149 as indicated by an arrow 162 in FIG. 3. The piston and cylinder assembly 150, if manually operated, would then be provided with a conventional relief valve so as to permit the piston rod 149 to be moved downwardly under the force of gravity.

As noted in FIG. 3, the piston and cylinder assembly 150 is operable to move the discharge tube assembly 110 as noted by an arrow 164 in FIG. 3 to adjust the vertical location of the discharge cyclone assembly 114.

The discharge cyclone assembly 114 is provided with a conical housing member 154 having an outlet opening 156 for discharge of the granular material 16 into the transport truck 20 as noted in FIG. 1.

USE AND OPERATION OF THE INVENTION

In the use and operation of the article organizer and holder assembly 12 of this invention as noted in FIG. 1, it is noted that the operator thereof places the pneumatic grain handling system 14 adjacent to a granular storage bin 18 for transfer of granular material 16 therefrom. Through use of the pneumatic grain handling system 14 and the material transfer assembly 12, the granular material 16 is moved pneumatically outwardly and upwardly for discharge from the discharge cyclone assembly 114 into the transport truck 20.

More specifically, the operator first energizes the pneumatic grain handling system 14 to start the main blower assembly 80 to create a suction on the vacuum hose member 92 of the primary material inlet assembly 40. An outer end of the vacuum hose member 92 is thereupon placed through the access opening 26 into the granular storage bin 18. The vacuum pressure then picks up the granular material 16 similar to any vacuum hose structure and transfers the same into the material receiver and separator assembly 34 through the material inlet opening 60. The deflector cones 52, 54 then aid in separation of the inlet air and the granular material 16 as noted in FIG. 2. The granular material 16 then falls downwardly into the mixing chamber 42 and swirling air 167 therein is pulled upwardly for discharge through the upper discharge opening 56 to the main blower assembly 80. The rotating vane assembly 86 thereupon moves the air outwardly therefrom to direct same to a lower portion of the airlock assembly 36.

This mixture of inlet air 169 under pressure and the granular material 16 received from the material receiver and separator assembly 34 then moves through the inlet tube assembly 106; the first tube member 116; the second tube member 118; and into the discharge joint assembly 108. The air and granular material 16 mixture is moved outwardly through the discharge tube assembly 110 into the discharge cyclone assembly 114 for subsequent movement into the open top section 30 of the transport truck 20.

On positioning the discharge cyclone assembly 14 in the proper relationship to the transport truck 20, the tube actuator assembly 112 is operable through the piston and cylinder assembly 150 to position the discharge tube assembly 110 in the proper height relative to the transport truck 20 as noted in FIG. 1.

It is noted that the position of the discharge tube assembly 110 can be adjusted about a vertical axis of the second tube member 118 as noted by an arrow 160 in FIG. 3. This is achieved through the use of the lock arm assembly 120 with the lock arm 127 moved to the unlatched position as noted in dotted lines in FIG. 11.

Thereupon the second tube member 118, through the use of the lock arm 127, is rotated about its vertical axis relative to a stationary first tube member 116. On proper positioning of the conical housing member 154 and the discharge cyclone assembly 114 relative to the transport truck 20, the lock arm 127 is thereupon moved downwardly to the vertical locked position as noted in solid lines in FIG. 11. This provides for the multiple adjustment about a vertical axis of the second tube member 118 and a horizontal axis of the discharge tube assembly 110 through use of the tube actuator assembly 112.

It is seen that the discharge joint assembly 108 provides a sealing connection about the ball joint member 128 so as to prevent pneumatic air from leaking therefrom. The seal member 144 engages an outer surface of the ball joint member 128 to provide a definite airtight seal therewith while permitting pivotal movement of the ball sleeve assembly 132 about the ball joint member 128. The conical discharge tube 134 provides for adjustment and movement of the discharge tube assembly 110 without interference of the discharge of the granular material 16 from the inlet tube member 130.

It is seen that the material transfer assembly of this invention provides a means for receiving the granular material from the pneumatic grain handling system and being easy to use achieving adjustable rotational movement about vertical and horizontal axes of the discharge cyclone assembly relative to a transport truck.

The material transfer assembly of this invention is economical to manufacture, simple to use, and substantially maintenance free.

While the invention has been described in conjunction with preferred specific embodiments thereof, it will be understood this description is intended to illustrate and not to limit the scope of the invention, which is defined by the following claims:

I claim:

1. A material transfer assembly connected to a pneumatic grain handling system operable to transfer a granular material from a storage container to a transport means, comprising:
   (a) an inlet tube assembly connected to a discharge mixer tube member from the pneumatic grain handling system to receive a mixture of the granular material and pneumatic fluid pressure therefrom;
   (b) a discharge joint assembly connected to said inlet tube assembly and adjustably movable about a vertical axis;
   (c) a discharge tube assembly connected to an output side of said discharge joint assembly projected laterally of said inlet tube assembly;
   (d) said inlet tube assembly includes a first tube member connected at one end to said discharge mixer tube member and a second tube member telescopingly mounted upon said first tube member and having another end thereof connected to said discharge joint assembly;
   (e) said first tube member includes a laterally extended support flange having said second tube member mounted thereon; and
   (f) said inlet tube assembly includes a lock arm assembly connected to said second tube member and selectively engagable with said support flange on said first tube member to anchor said second tube member thereto in a selected adjusted rotational position relative thereto;
   whereby a discharge of the mixture of the granular material and pneumatic fluid pressure from said discharge tube assembly can be adjusted as required to direct same into the transport means.

2. A material transfer assembly as described in claim 1, including:
   (a) said lock arm assembly having anchor members secured to said second tube member and a cam lock member pivotally connected to said anchor members; and
   (b) said cam lock member having a cam member connected to a lock arm and said cam member being selectively movable to engaged and disengaged conditions with said support flange to prevent relative rotational movement of said second tube member relative to said first tube member when in a locked condition.

3. A material transfer assembly connected to a material handling system operable to receive and transfer a material for discharge at a selected height and direction to a receiving station, comprising:
   (a) an inlet tube assembly to receive the material;
   (b) a discharge joint assembly connected to said inlet tube assembly and adjustably movable about a vertical axis;
   (c) a discharge tube assembly connected to an output side of said discharge joint assembly projected laterally of said inlet tube assembly;
   (d) a tube actuator assembly mounted between said inlet tube assembly and said discharge tube assembly to pivotally and selectively move said discharge tube assembly and said discharge joint assembly about a horizontal axis;
   (e) said inlet tube assembly includes a first tube member and a second tube member telescopingly mounted upon said first tube member and having another end thereof connected to said discharge joint assembly;
   (f) said first tube member includes a laterally extended support flange having said second tube member mounted thereon; and
   (g) said inlet tube assembly includes a lock arm assembly connected to said second tube member and selectively engagable with said support flange on said first tube member to anchor said second tube member thereto in a selected adjusted rotational position relative thereto.

4. A material transfer assembly as described in claim 3, including:
   (a) said lock arm assembly having anchor members secured to said second tube member and a cam lock member pivotally connected to said anchor members; and
   (b) said cam lock member having a cam member connected to a lock arm and said cam member being selectively movable to engaged and disengaged conditions with said support flange to prevent relative rotational movement of said second tube member relative to said first tube member when in a locked condition.

5. A material transfer assembly connected to a pneumatic grain handling system operable to transfer a granular material from a storage container to a transport means, comprising:
   (a) an inlet tube assembly connected to a discharge mixer tube member from the pneumatic grain handling system to receive a mixture of the granular material and pneumatic fluid pressure therefrom;

(b) a discharge joint assembly connected to said inlet tube assembly and adjustably movable about a vertical axis;
(c) a discharge tube assembly connected to an output side of said discharge joint assembly projected laterally of said inlet tube assembly;
(d) said inlet tube assembly includes a first tube member connected at one end to said discharge mixer tube member and a second tube member telescopingly mounted upon said first tube member and having another end thereof connected to said discharge joint assembly;
(e) a tube actuator assembly mounted between said second tube member and said discharge tube assembly on opposite sides of said discharge joint assembly; and
(f) said tube actuator assembly includes a piston and cylinder assembly operable to pivot said discharge tube assembly and a portion of said discharge joint assembly about a horizontal axis to regulate the position of a discharge opening from said discharge tube assembly to provide for further adjustment of material discharge therefrom;

whereby the second tube member is rotatable about said first tube member to a desired adjusted position for discharge of the mixture from said discharge tube assembly to a desired location.

6. A material transfer assembly as described in claim 5, wherein:
(a) said tube actuator includes a support plate member secured to said second tube member;
(b) said piston and cylinder assembly pivotally connected to said support plate member; and
(c) said piston and cylinder assembly having a cylinder member with piston rod extended therefrom and secured at an upper outer end to said discharge tube assembly;

whereby said piston rod is selectively movable within said cylinder member so as to provide for pivotal movement of said discharge joint assembly and height adjustment of the material discharge from said discharge tube assembly.

7. A material transfer assembly connected to a material handling system operable to receive and transfer a material for discharge at a selected height and direction to a receiving station, comprising:
(a) an inlet tube assembly to receive the material;
(b) a discharge joint assembly connected to said inlet tube assembly and adjustably movable about a vertical axis;
(c) a discharge tube assembly connected to an output side of said discharge joint assembly projected laterally of said inlet tube assembly;
(d) a tube actuator assembly mounted between said inlet tube assembly and said discharge tube assembly to pivotally and selectively move said discharge tube assembly and said discharge joint assembly about a horizontal axis;
(e) said inlet tube assembly includes a first tube member and a second tube member telescopingly mounted upon said first tube member and having another end thereof connected to said discharge joint assembly;
(f) a tube actuator assembly mounted between said second tube member and said discharge tube assembly on opposite sides of said discharge joint assembly; and
(g) said tube actuator assembly includes a piston and cylinder assembly operable to pivot said discharge tube assembly and a portion of said discharge joint assembly about a horizontal axis to regulate the position of a discharge opening from said discharge tube assembly to provide for further adjustment of material discharge therefrom;

whereby said second tube member is rotatable about said first tube member to a desired adjusted position for discharge of the material from said discharge tube assembly to a desired location.

8. A material transfer assembly as described in claim 7, wherein:
(a) said tube actuator assembly includes a support plate member secured to said second tube member;
(b) said piston and cylinder assembly pivotally connected to said support plate member; and
(c) said piston and cylinder assembly having a cylinder member with piston rod extended therefrom and secured at an upper outer end to said discharge tube assembly;

whereby said piston rod is selectively movable within said cylinder member so as to provide for pivotal movement of said discharge joint assembly and height adjustment of the material discharge from said discharge tube assembly.

9. A material transfer assembly connected to a material handling system operable to receive and transfer a material for discharge at a selected height and direction to a receiving station, comprising:
(a) an inlet tube assembly to receive the material;
(b) a discharge joint assembly connected to said inlet tube assembly and adjustably movable about a vertical axis;
(c) a discharge tube assembly connected to an output side of said discharge joint assembly projected laterally of said inlet tube assembly;
(d) said inlet tube assembly includes a first tube member and a second tube member telescopingly mounted upon said first tube member and having another end thereof connected to said discharge joint assembly;
(e) said first tube member includes said second tube member mounted thereon for rotational movement of said second tube member about a common axis with said first tube member;
(f) said first tube member includes a laterally extended support flange having said second tube member mounted thereon; and
(g) said inlet tube assembly includes a lock arm assembly to selectively anchor said second tube member to said first tube member in a selected adjusted rotational position;

whereby said second tube member is rotatable about said first tube member to a desired adjusted position for discharge of the material from said discharge tube assembly to a desired location.

10. A material transfer assembly as described in claim 9, wherein:
(a) a tube actuator assembly mounted between said second tube member and said discharge tube assembly; and
(b) said tube actuator assembly includes a piston and cylinder assembly to pivot said discharge tube assembly about a horizontal axis.

* * * * *